(12) United States Patent
Chuang et al.

(10) Patent No.: US 12,222,604 B2
(45) Date of Patent: Feb. 11, 2025

(54) WAVELENGTH CONVERSION ELEMENT AND BACKLIGHT MODULE

(71) Applicant: Coretronic Corporation, Hsin-Chu (TW)

(72) Inventors: Ching-Nan Chuang, Hsinchu County (TW); Hung-Tse Lin, Hsinchu County (TW); Ming-Dah Liu, Hsinchu County (TW); Yen-Ni Lin, Hsinchu County (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/460,616

(22) Filed: Sep. 4, 2023

(65) Prior Publication Data

US 2024/0085739 A1 Mar. 14, 2024

(30) Foreign Application Priority Data

Sep. 13, 2022 (CN) .......................... 202211108158.1

(51) Int. Cl.
| | | |
|---|---|---|
| *G02F 1/1334* | (2006.01) | |
| *G02F 1/1335* | (2006.01) | |
| *G02F 1/13357* | (2006.01) | |

(52) U.S. Cl.
CPC ...... *G02F 1/133609* (2013.01); *G02F 1/1334* (2013.01); *G02F 1/133607* (2021.01)

(58) Field of Classification Search
CPC ............. G02F 1/1334; G02F 1/133609; G02F 1/133607
USPC ....................................................... 362/97.1
See application file for complete search history.

(56) References Cited

U.S. PATENT DOCUMENTS

| | | | |
|---|---|---|---|
| 10,784,308 B2 | 9/2020 | Kim et al. | |
| 2015/0219310 A1 | 8/2015 | Lee et al. | |
| 2016/0348856 A1* | 12/2016 | Owada | ............... C09K 11/7773 |
| 2019/0194531 A1 | 6/2019 | Oba et al. | |
| 2019/0212610 A1* | 7/2019 | Kim | ................... H10K 59/8792 |

(Continued)

FOREIGN PATENT DOCUMENTS

| | | |
|---|---|---|
| CN | 104576892 | 4/2015 |
| CN | 110729282 | 1/2020 |
| CN | 111752036 | 10/2020 |

(Continued)

OTHER PUBLICATIONS

"Office Action of Taiwan Counterpart Application", issued on Nov. 22, 2024, p. 1-p. 7.

*Primary Examiner* — Christopher M Raabe
(74) *Attorney, Agent, or Firm* — JCIPRNET

(57) ABSTRACT

A wavelength conversion element including a substrate, a blocking wall structure layer, and a wavelength conversion layer is provided. The blocking wall structure layer is disposed on a surface of the substrate and defines multiple microgrooves. Reflectivity of the blocking wall structure layer is in a range of 1% to 99%. The wavelength conversion layer is disposed in the microgrooves and includes multiple wavelength conversion particles. A height of the blocking wall structure layer along a normal direction of the surface of the substrate is greater than a height of the wavelength conversion layer along the normal direction of the surface of the substrate. A backlight module adopting the wavelength conversion element is also provided.

17 Claims, 12 Drawing Sheets

(56) References Cited

U.S. PATENT DOCUMENTS

2021/0191198 A1* 6/2021 Musa .................. C09B 3/10
2022/0149251 A1* 5/2022 Park .................. H01L 25/0753

FOREIGN PATENT DOCUMENTS

| CN | 111048654 | 10/2021 |
| CN | 110579905 | 8/2022 |
| TW | I712843 | 12/2020 |
| TW | 202335283 | 9/2023 |
| TW | I824713 | 12/2023 |

* cited by examiner

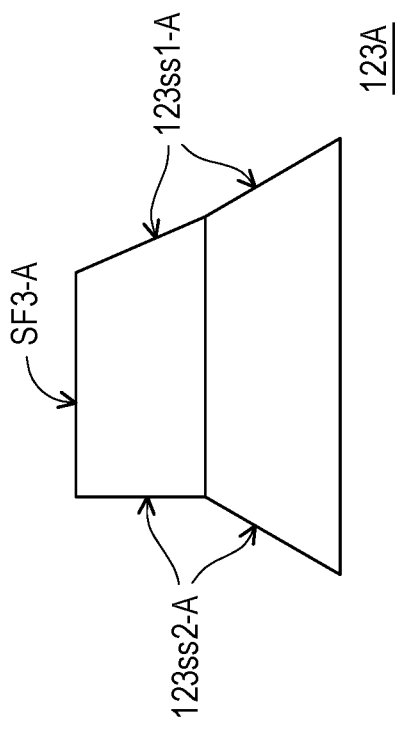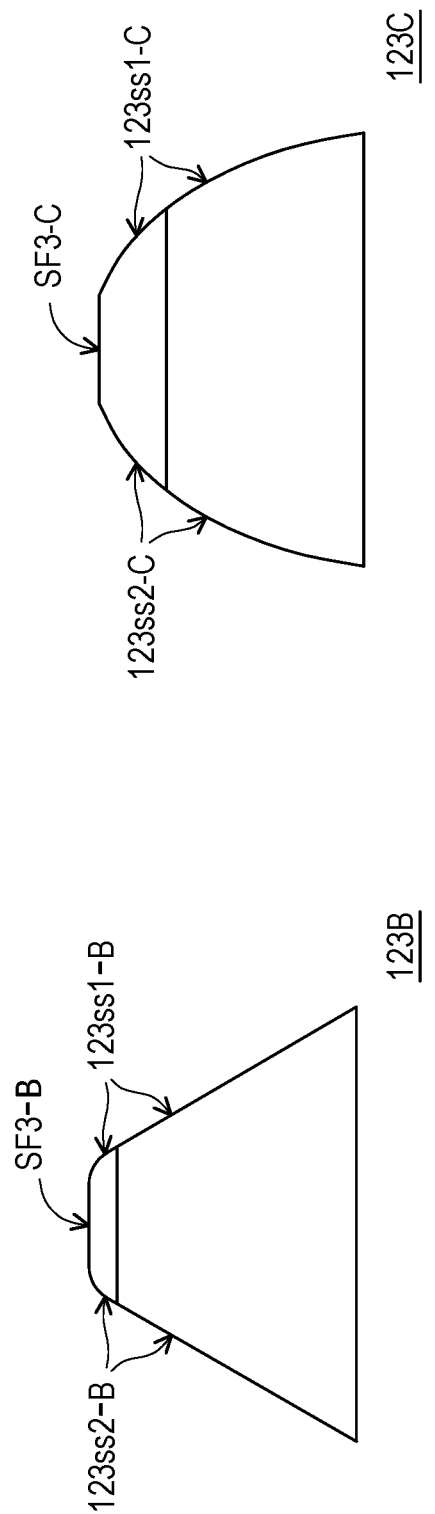

WAVELENGTH CONVERSION ELEMENT AND BACKLIGHT MODULE

CROSS-REFERENCE TO RELATED APPLICATION

This application claims the priority benefit of China application serial no. 202211108158.1, filed on Sep. 13, 2022. The entirety of the above-mentioned patent application is hereby incorporated by reference herein and made a part of this specification.

BACKGROUND

Technical Field

The disclosure relates to a light source technology, and more particularly, to a wavelength conversion element and a backlight module.

Description of Related Art

Since the liquid crystal itself does not have the capability to emit light, a display panel is required to rely on a backlight module to provide a backlight source to display images. Therefore, it is one of the objectives of enhancing the liquid crystal display technology to improve the color quality of the backlight source, and the quantum dot technology just meets the basic concept of this requirement. In detail, in the quantum dot technology, the red light and green light are respectively excited by irradiating green quantum dots and red quantum dots with different diameters with a blue light-emitting diode light source, so as to achieve the three primary colors of red light, green light, and blue light required for full-color display. In addition, light is decomposed with high efficiency, thereby achieving high reproducibility of chromaticity, greatly increasing a color gamut thereof, and enable colors of LCD display to be more vivid.

In the existing technology framework, due to the energy-level coordination design of quantum dots in the structure, it is necessary to use a sandwich structure to encapsulate the quantum dot material in a water-oxygen barrier film, so as to stabilize the luminance and chromaticity of the light converted by the quantum dot material. Since the light converted by the quantum dot material has no specific directionality, but is scattered in all directions, it is difficult to adjust a subsequent light-emitting distribution pattern through an optical film, and is prone to light leakage.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wavelength conversion element, which has better conversion efficiency and a higher amount of light emission of a conversion beam in a normal direction.

The disclosure provides a backlight module with a high assembly yield and relatively thin overall thickness.

Other objectives and advantages of the disclosure may be further understood from the technical features disclosed herein.

In order to achieve one, a part, or all of the above objectives or other objectives, an embodiment of the disclosure provides a wavelength conversion element. The wavelength conversion element includes a substrate, a blocking wall structure layer, and a wavelength conversion layer. The blocking wall structure layer is disposed on a surface of the substrate and defines multiple microgrooves. Reflectivity of the blocking wall structure layer is in a range of 1% to 90%. The wavelength conversion layer is disposed in the microgrooves. The wavelength conversion layer includes multiple wavelength conversion particles. A height of the blocking wall structure layer along a normal direction of the surface of the substrate is greater than a height of the wavelength conversion layer along the normal direction of the surface of the substrate.

In order to achieve one, a part, or all of the above objectives or other objectives, an embodiment of the disclosure provides a backlight module. The backlight module includes a light source and a wavelength conversion element. The light source is adapted to provide an excitation beam. The wavelength conversion element is disposed on a transmission path of the excitation beam, and includes a substrate, a blocking wall structure layer, and a wavelength conversion layer. The blocking wall structure layer is disposed on a surface of the substrate and defines multiple microgrooves. Reflectivity of the blocking wall structure layer is in a range of 1% to 90%. The wavelength conversion layer is disposed in the microgrooves and includes multiple wavelength conversion particles. A height of the blocking wall structure layer along a normal direction of the surface of the substrate is greater than a height of the wavelength conversion layer along the normal direction of the surface of the substrate.

Based on the above, in the wavelength conversion element and the backlight module according to the embodiment of the disclosure, the wavelength conversion layer is disposed in the microgrooves of the blocking wall structure layer, and the filling height of the wavelength conversion layer is lower than the height of the blocking wall structure layer. Since the reflectivity of the blocking wall structure layer is in the range of 1% to 90%, in addition to increasing the conversion efficiency of the excitation beam, it may also limit the scattering angle of the conversion beam to increase the amount of light emission in the normal direction. On the other hand, the configuration of the blocking wall structure layer may further improve the stiffness of the wavelength conversion element, which may not only meet the thinning requirements for the overall thickness, but also avoid the issue of the decline in the assembly yield of the backlight module after thinning.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

FIGS. 7A to 7G are schematic cross-sectional views of a blocking wall structure layer according to other modified embodiments of FIG. 6.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
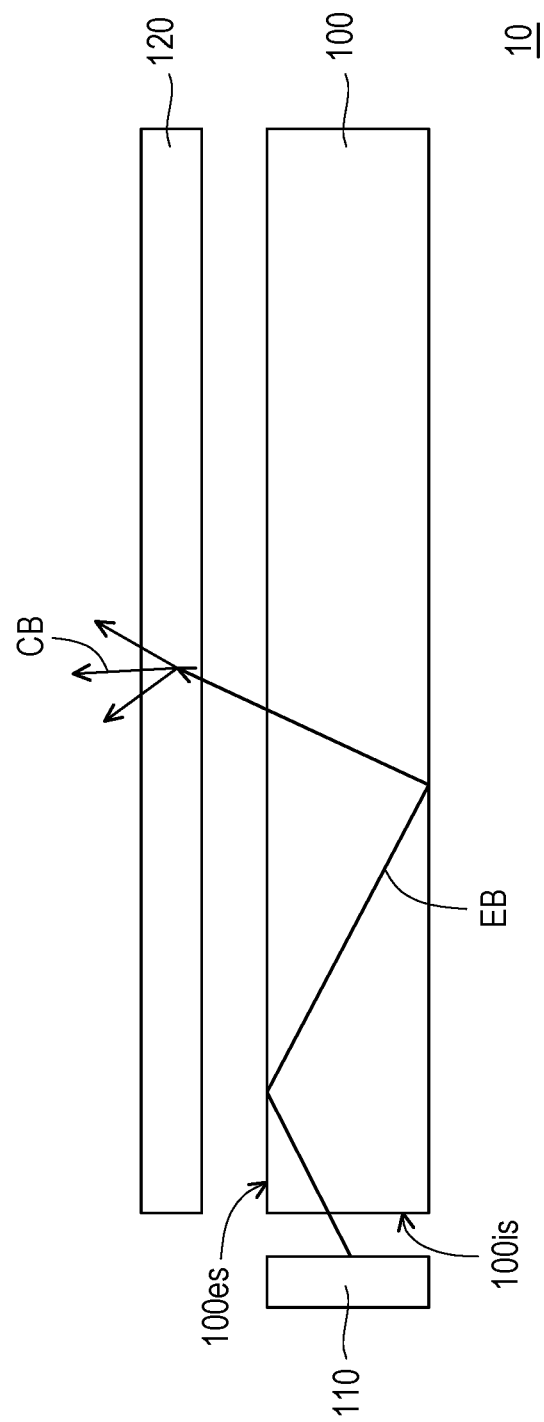
FIG. 1 is a schematic cross-sectional view of a backlight module according to an embodiment of the disclosure.
Figure 2:
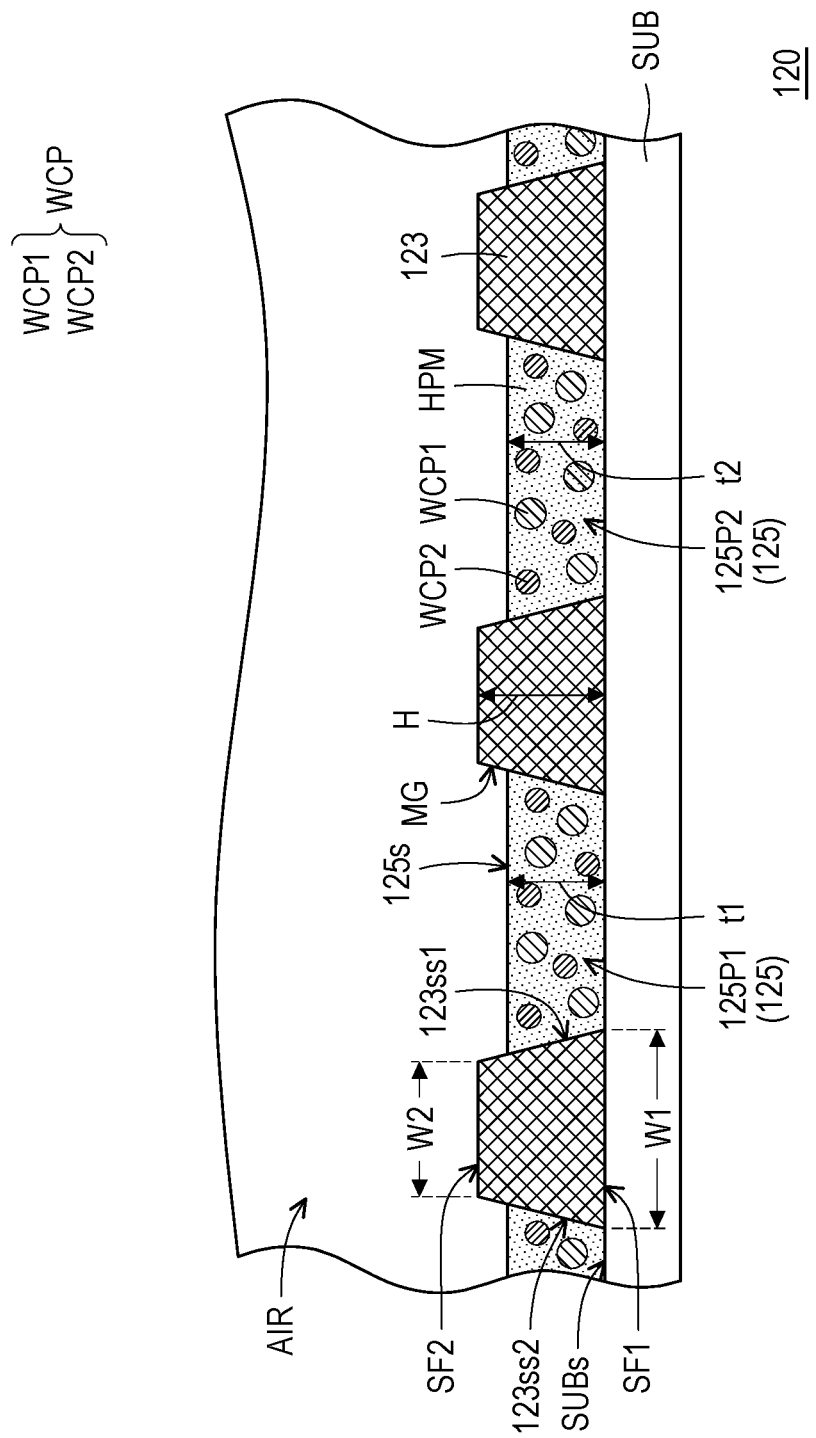
FIG. 2 is a schematic enlarged view of a wavelength conversion element in FIG. 1.
Figure 3:
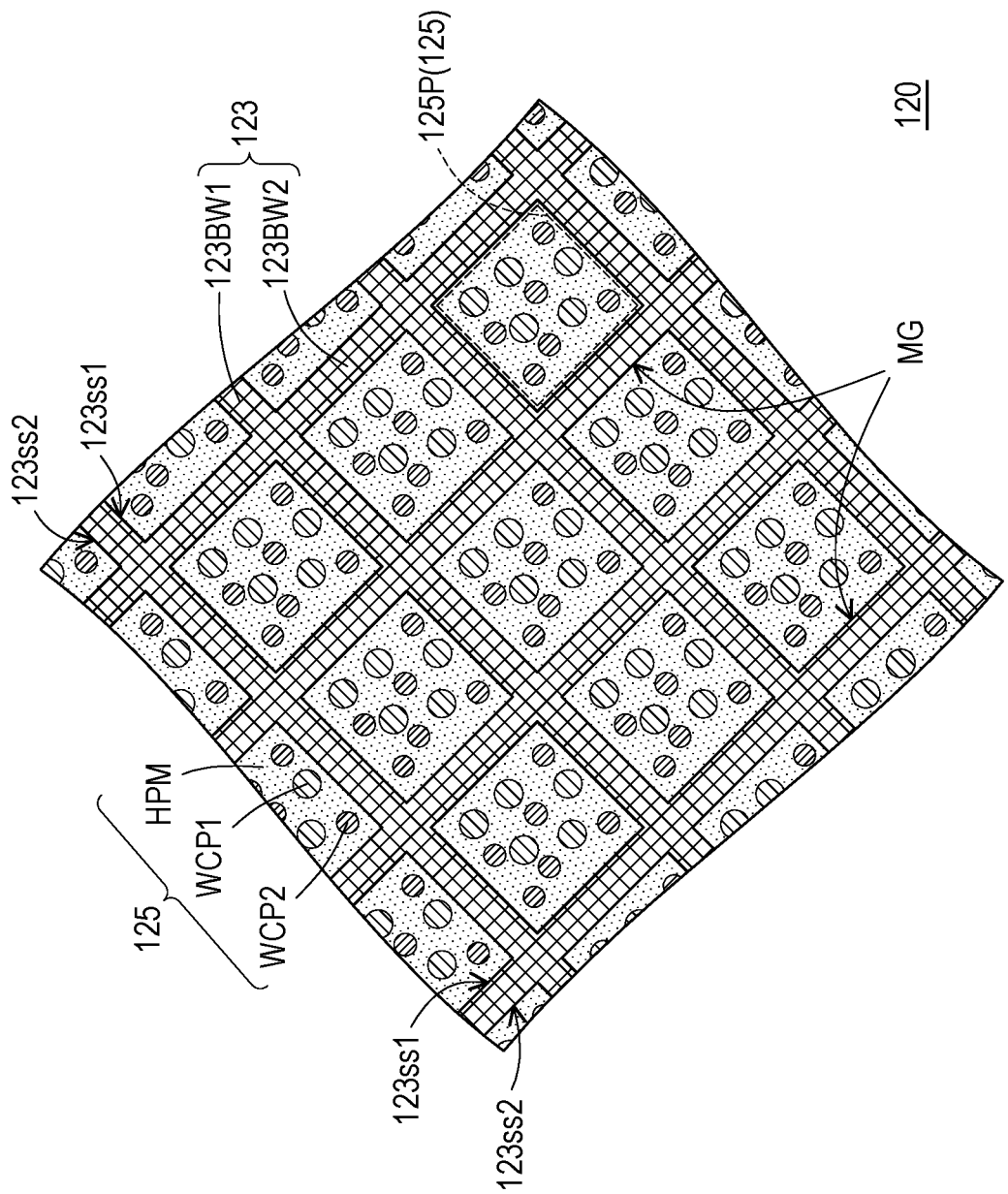
FIG. 3 is a schematic top view of the wavelength conversion element in FIG. 2.
Figure 4:
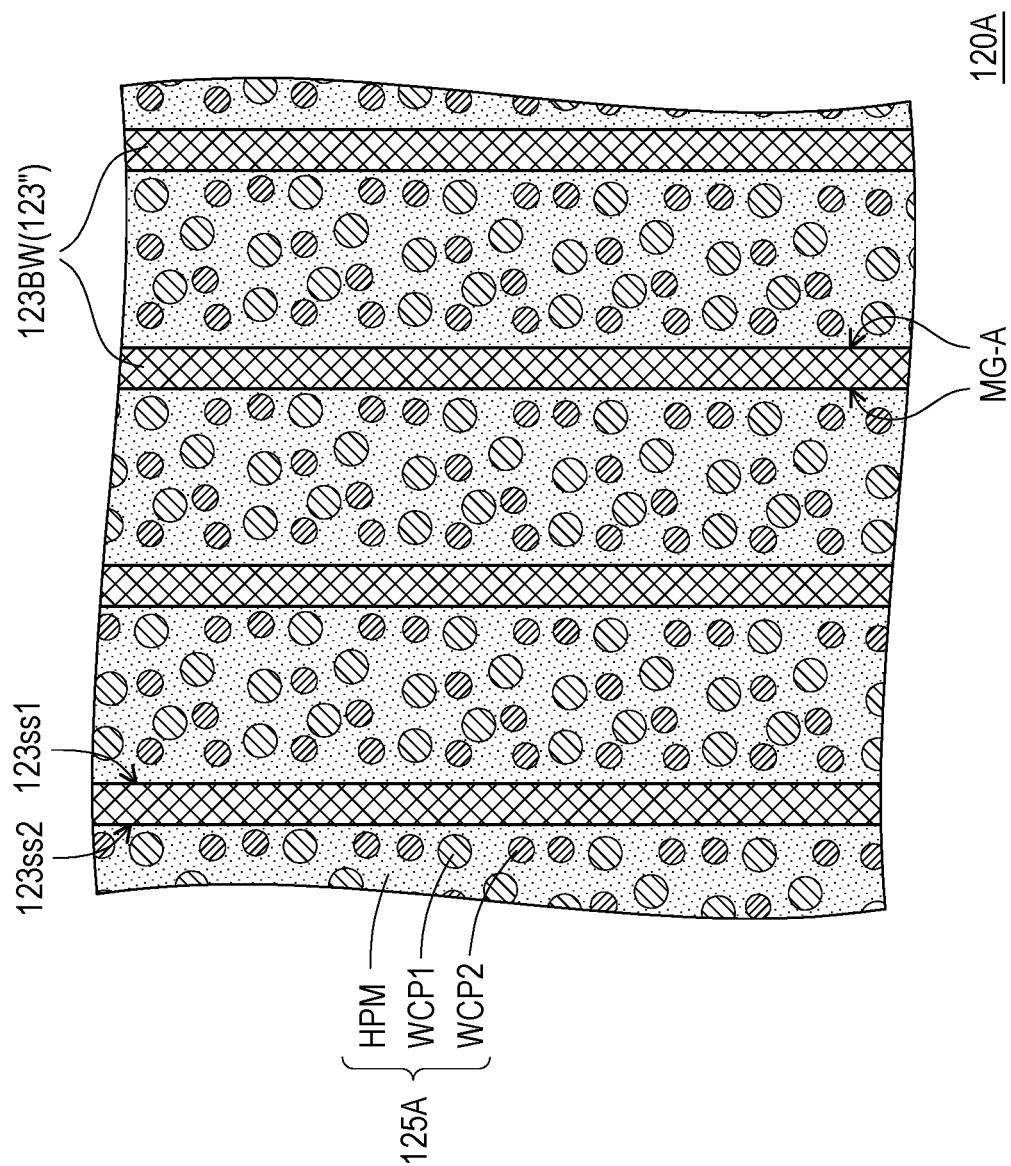
FIG. 4 is a schematic top view of a wavelength conversion element according to another modified embodiment of FIG. 3.
Figure 5:
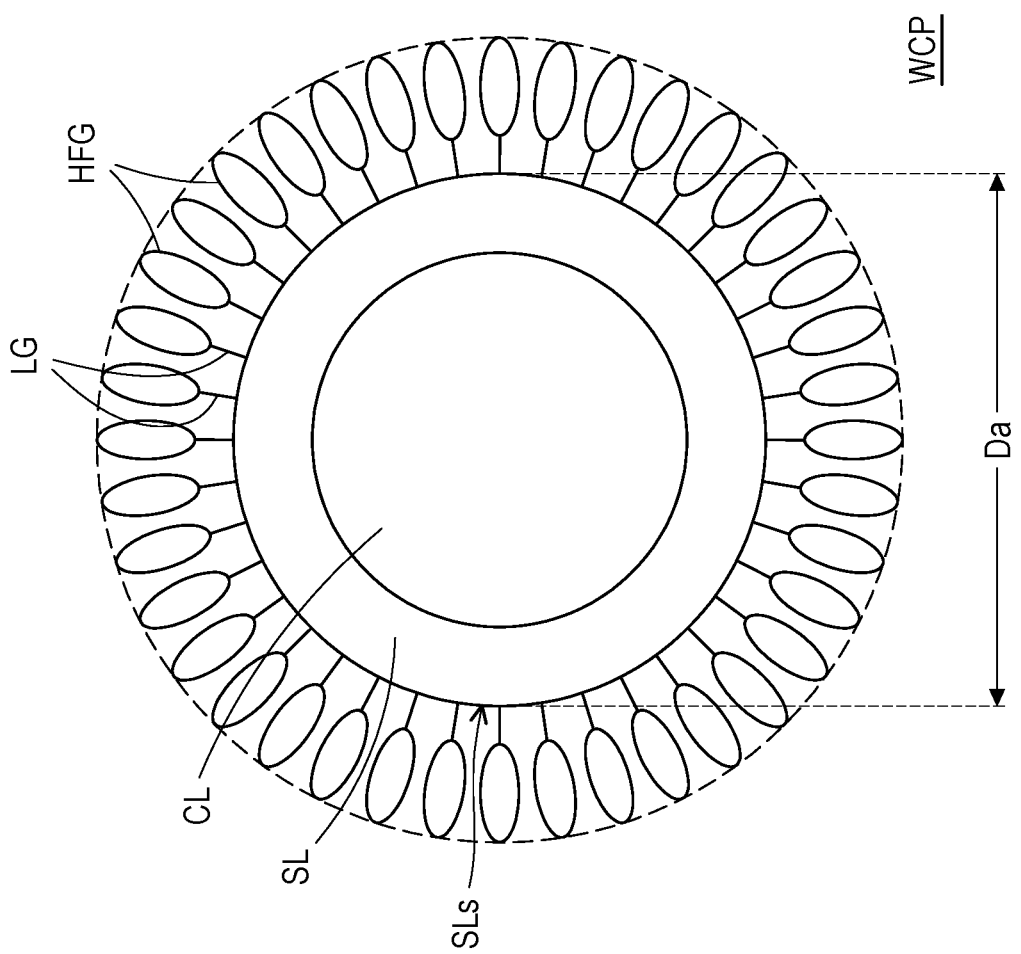
FIG. 5 is a schematic enlarged view of wavelength conversion particles in FIG. 2.
Figure 6:
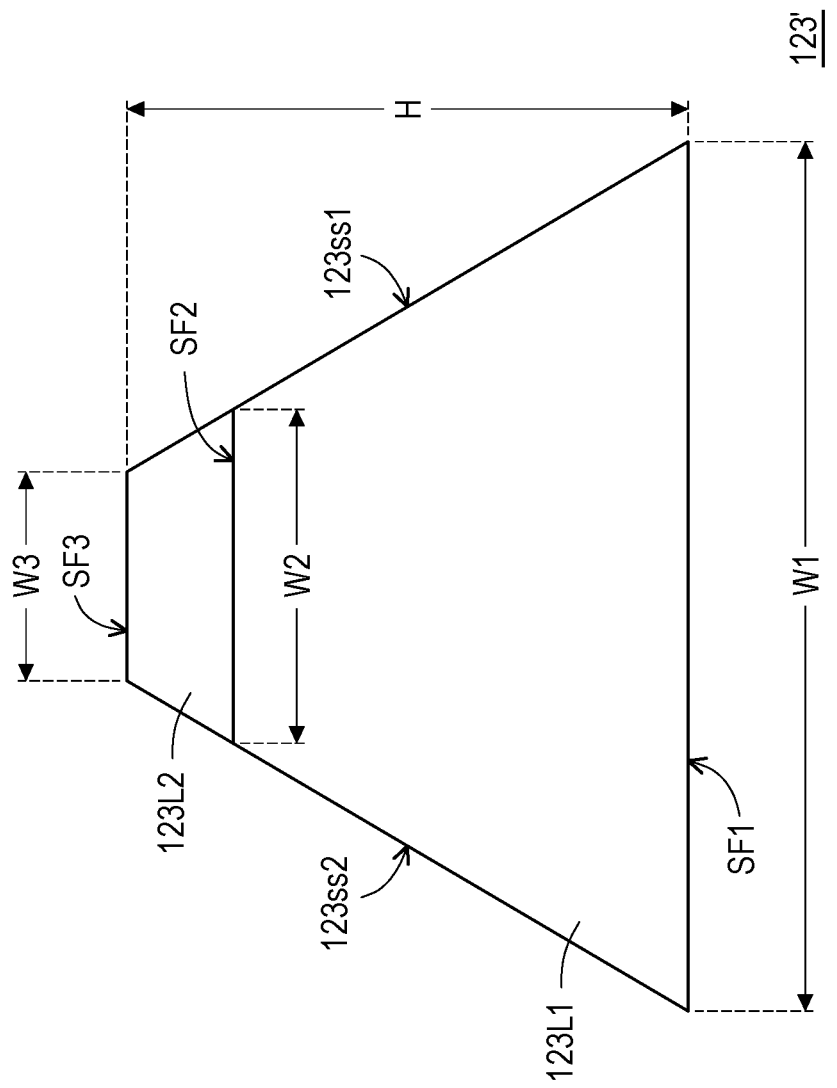
FIG. 6 is a schematic enlarged view of a blocking wall structure layer according to another embodiment of FIG. 2.

FIG. 1 is a schematic cross-sectional view of a backlight module according to an embodiment of the disclosure. FIG. 2 is a schematic enlarged view of a wavelength conversion element in FIG. 1. FIG. 3 is a schematic top view of the wavelength conversion element in FIG. 2. FIG. 4 is a schematic top view of a wavelength conversion element according to another modified embodiment of FIG. 3. FIG. 5 is a schematic enlarged view of wavelength conversion particles in FIG. 2. FIG. 6 is a schematic enlarged view of a blocking wall structure layer according to another embodiment of FIG. 2. FIGS. 7A to 7G are schematic cross-sectional views of a blocking wall structure layer according to other modified embodiments of FIG. 6.

Referring to FIG. 1, a backlight module 10 includes alight guide plate 100, alight source 110, and a wavelength conversion element 120. The light guide plate 100 has a light incident surface 100$is$ and a light-emitting surface 100$es$ connected to the light incident surface 100$is$. The light source 110 is disposed on one side of the light incident surface 100$is$ of the light guide plate 100. The wavelength conversion element 120 is disposed on one side of the light-emitting surface 100$es$ of the light guide plate 100. More specifically, the backlight module 10 in this embodiment is a side-entry backlight module, but the disclosure is not limited thereto.

In this embodiment, the light source 110 is adapted to provide an excitation beam EB toward the light incident surface 100$is$ of the light guide plate 100, and the excitation beam EB leaves the light guide plate 100 from the light-emitting surface 100$es$ of the light guide plate 100 after being transmitted laterally through the light guide plate 100 and is incident to the wavelength conversion element 120. The wavelength conversion element 120 is disposed on a transmission path of the excitation beam EB, and is adapted to receive the excitation beam EB from the light guide plate 100 and emit a conversion beam CB.

Referring to FIGS. 2 and 3, the wavelength conversion element 120 includes a substrate SUB, a blocking wall structure layer 123, and a wavelength conversion layer 125. The blocking wall structure layer 123 is disposed on a surface SUBs of the substrate SUB, and defines multiple microgrooves MG. The wavelength conversion layer 125 is disposed in the microgrooves MG. In this embodiment, the blocking wall structure layer 123 may be formed by cross-arranging multiple first blocking walls 123BW1 and multiple second blocking walls 123BW2.

For example, an arrangement direction of the first blocking walls 123BW1 may be perpendicular to an arrangement direction of the second blocking walls 123BW2, and an extension direction of the first blocking walls 123BW1 may be perpendicular to an extension direction of the second blocking walls 123BW2. That is to say, the blocking wall structure layer 123 in this embodiment is a mesh structure in a normal direction of the surface SUBs of the substrate SUB. In this embodiment, the microgrooves MG defined by the blocking wall structure layer 123 may be arranged along the arrangement direction of the first blocking walls 123BW1 or the second blocking walls 123BW2. That is, the microgrooves MG are arranged at intervals on the substrate SUB in a two-dimensional array, and the wavelength conversion layer 125 disposed in the microgrooves MG is divided into multiple wavelength conversion patterns 125P arranged at intervals and in a square shape by the blocking wall structure layer 123.

However, the disclosure is not limited thereto. Referring to FIG. 4, in another embodiment, a blocking wall structure layer 123" of a wavelength conversion element 120A may also be formed by multiple blocking walls 123BW with a single extension direction arranged at intervals along a single direction (such as a horizontal direction in FIG. 4). Therefore, multiple microgrooves MG-A defined by the blocking wall structure layer 123" are also arranged at intervals along the single direction, and a wavelength conversion layer 125A disposed in the microgrooves MG-A may be divided into multiple wavelength conversion patterns arranged at intervals along the single direction and in a long strip shape. In another unillustrated embodiment, the microgrooves defined by the blocking wall structure layer may further be arranged in a honeycomb manner.

Referring to FIG. 2, it should be noted that a height H of the blocking wall structure layer 123 along the normal direction of the surface SUBs of the substrate SUB is greater than a height (that is, a thickness t1 of a wavelength conversion pattern 125P1 or a thickness t2 of a wavelength conversion pattern 125P2) of the wavelength conversion layer 125 along the normal direction of the surface SUBs of the substrate SUB, and reflectivity of the blocking wall structure layer 123 is in a range of 1% to 90%. Accordingly, the excitation beam EB may be reflected back to the wavelength conversion layer 125 in the microgroove MG by the blocking wall structure layer 123. In addition to increasing conversion efficiency of the excitation light beam EB, it may also limit a scattering angle of the conversion beam CB to increase an amount of light emission in a normal direction. In this embodiment, a material of the blocking wall structure layer 123 includes a base material (such as acrylic resin) and a high reflective material (such as titanium dioxide, polymethyl methacrylate, polycarbonate, or polystyrene). The high reflective material is uniformly mixed in the base material. Preferably, the height H of the blocking wall structure layer 123 along the normal direction of the surface SUBs of the substrate SUB may be less than 1 mm, so as to improve a process yield and ensure light-emitting quality of the backlight module 10.

On the other hand, in this embodiment, the blocking wall structure layer 123 has a first surface SF1 and a second surface SF2 away from each other along the normal direction of the surface SUBs of the substrate SUB. The first surface SF1 and the second surface SF2 have a first width W1 and a second width W2 respectively along a direction (such as a direction parallel to the surface SUBs of the substrate SUB, a horizontal direction in FIG. 2, or a direction perpendicular to an extension direction of the blocking wall structure layer 123). In particular, the second width W2 of the blocking wall structure layer 123 is less than or equal to the first width W1, and the widths are all less than 0.4 mm. In this way, visibility of the blocking wall structure layer 123 in the normal direction of the surface SUBs of the substrate SUB may be greatly reduced, so as to ensure display quality of a display using the backlight module 10.

Further, the wavelength conversion layer 125 may include multiple wavelength conversion particles WCP. In this embodiment, types of the wavelength conversion particles WCP are illustrated with two examples, such as wavelength conversion particles WCP1 and wavelength conversion particles WCP2, but the disclosure is not limited thereto. In other embodiments, the types of the wavelength conversion particles WCP included in the wavelength conversion layer may be adjusted according to actual application requirements.

For example, in this embodiment, the wavelength conversion particle WCP1 is adapted to emit red light after absorbing the incident excitation beam EB (as shown in FIG. 1), and the wavelength conversion particle WCP2 is adapted to emit green light after absorbing the incident excitation beam EB. The excitation beam EB is, for example, blue light, but the disclosure is not limited thereto. For example, the excitation beam EB may also be ultraviolet with a wavelength between 200 nm and 450 nm.

Referring to FIGS. 2 and 5, the wavelength conversion particle WCP includes a core layer CL, a shell layer SL, and multiple hydrophobic functional groups HFG, as shown in FIG. 5. The shell layer SL covers the core layer CL. The hydrophobic functional groups HFG are disposed on a surface SLs of the shell layer SL away from the core layer CL. In detail, the core layer CL of the wavelength conversion particle WCP is a light-emitting core, and a material thereof includes, for example, cadmium selenide (CdSe), cadmium sulfide (CdS), or zinc selenide (ZnSe), but the disclosure is not limited thereto. In order to prevent the core layer CL from being ineffective due to intrusion of water vapor and oxygen, the shell layer SL covering the core layer CL may be used as a protective layer, and a material thereof includes, for example, silicon dioxide ($SiO_2$), cadmium sulfide, zinc selenide, etc. However, the disclosure is not limited thereto. In this embodiment, a total particle diameter Da of the core layer CL and the shell layer SL of the wavelength conversion particle WCP may be between 22 nm and 25 nm.

The surface SLs of the shell layer SL may have multiple ligands LG. The hydrophobic functional groups HFG may be coordinated on the surface SLs of the shell layer SL by the ligands LG to form a hydrophobic film layer. In this embodiment, the hydrophobic functional group HFG is a polysilane polymer, for example. By covering with the hydrophobic film layer, the water and oxygen blocking capability of the wavelength conversion particle WCP may be further improved. Therefore, in this embodiment, the wavelength conversion layer 125 is not required to be provided with an additional protective layer, barrier layer, or another substrate on a surface 125s away from the substrate SUB to block the water and oxygen, which contributes to the thinning of the wavelength conversion element 120. More specifically, the surface 125s of the wavelength conversion layer 125 may be exposed to air AIR.

In this embodiment, the wavelength conversion layer 125 may further include a hydrophobic substrate HPM, and the wavelength conversion particles WCP are dispersedly disposed in the hydrophobic substrate HPM. A material of the hydrophobic substrate HPM includes, for example, epoxy silicon, silicone, or acrylic. Accordingly, the water and oxygen blocking capability of the wavelength conversion layer 125 may be further improved. However, the disclosure is not limited thereto. In other embodiments, a substrate material of the wavelength conversion layer may also include a non-hydrophobic substrate.

In particular, through the configuration of the blocking wall structure layer 123, stiffness of the thinned wavelength conversion element 120 may be further increased, so that a selected thickness of the substrate SUB may be reduced to between 12 μm and 50 μm, and then an overall thickness of the wavelength conversion element 120 may be less than 100 μm. That is to say, the thinned wavelength conversion element 120 may be supported by the blocking wall structure layer 123 to have the sufficient stiffness to avoid a decline in an assembly yield of the backlight module 10.

On the other hand, the configuration of the blocking wall structure layer 123 may further increase uniformity of a film thickness of the wavelength conversion layer 125. For example, a thickness difference (for example, an insulation value of the thickness difference of t2-t1 between the wavelength conversion pattern 125P1 and the wavelength conversion pattern 125P2 in FIG. 2) between any two of the wavelength conversion patterns 125P respectively filled in the microgrooves MG along the normal direction of the surface SUBs of the substrate SUB may be less than or equal to 0.5 μm.

From another point of view, since the wavelength conversion patterns 125P filled in the microgrooves MG of the blocking wall structure layer 123 have better uniformity of the film thickness, a chromaticity difference of the conversion beams CB emitted by the wavelength conversion patterns 125P after absorbing the excitation beam EB at a chromaticity coordinate x in a CIE1931 color space may be less than 0.01, and the chromaticity difference at a chromaticity coordinate y in the CIE1931 color space may be less than 0.01. That is to say, the conversion beams CB emitted by the wavelength conversion patterns 125P respectively disposed in the microgrooves MG may have better chromaticity uniformity. Preferably, the chromaticity differences of the conversion beams CB at the chromaticity coordinate x and at the chromaticity coordinate y in the CIE1931 color space are both less than 0.005.

Referring to FIGS. 2 and 6, different from the blocking wall structure layer 123 in FIG. 2, in another embodiment, a blocking wall structure layer 123' may include a first structure layer 123L1 and a second structure layer 123L2 stacked in the normal direction of the surface SUBs of the substrate SUB. The first structure layer 123L1 has the first surface SF1 and the second surface SF2 away from each other along the normal direction of the surface SUBs of the substrate SUB. The second surface SF2 of the first structure layer 123L1 is connected to the second structure layer 123L2. The second structure layer 123L2 has a third surface SF3 away from the second surface SF2. The first surface SF1, the second surface SF2, and the third surface SF3 have the first width W1, the second width W2, and a third width W3 respectively along a direction (such as, the direction parallel to the surface SUBs of the substrate SUB, or a horizontal direction in FIG. 6, or the direction perpendicular to the extension direction of the blocking wall structure layer 123).

It should be noted that the second width W2 of the blocking wall structure layer 123 is less than or equal to the first width W1. The third width W3 is less than the second width W2. The widths are all less than 0.4 mm. In this way, the visibility of the blocking wall structure layer 123 in the normal direction of the surface SUBs of the substrate SUB may be greatly reduced, so as to ensure the display quality of the display using the backlight module 10.

However, the disclosure is not limited thereto. In other modified embodiments, a first side surface and a second side surface of the blocking wall structure layer may also each be a folded surface (e.g., a first side surface 123ss1-A and a second side surface 123ss2-A of a blocking wall structure layer 123A in FIG. 7A and a first side surface 123ss1-E and a second side surface 123ss2-E of a blocking wall structure layer 123E in FIG. 7E), a curved surface (e.g., a first side surface 123ss1-C and a second side surface 123ss2-C of a blocking wall structure layer 123C in FIG. 7C and a first side surface 123ss1-G and a second side surface 123ss2-G of a blocking wall structure layer 123G in FIG. 7G), or a combination (e.g., a first side surface 123ss1-B and a second side surface 123ss2-B of a blocking wall structure layer 123B in FIG. 7B and a first side surface 123ss1-F and a second side surface 123ss2-F of a blocking wall structure layer 123F in FIG. 7F) of a flat surface (e.g., a first side surface 123ss1 and a second side surface 123ss2 of the blocking wall structure layer 123 in FIG. 6 and a first side surface 123ss1-D and a second side surface 123ss2-D of a blocking wall structure layer 123D in FIG. 7D) and the curved surface.

Figure 7E:
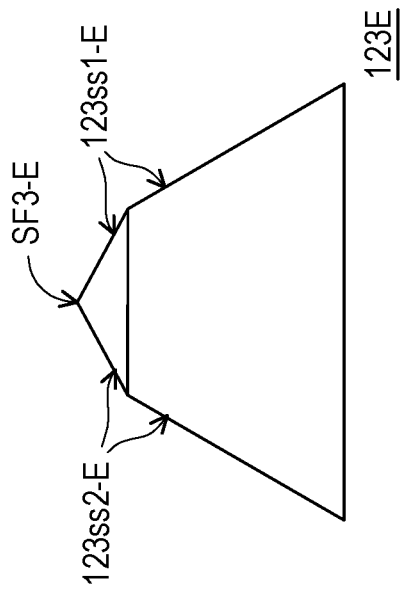
Figure 7G:
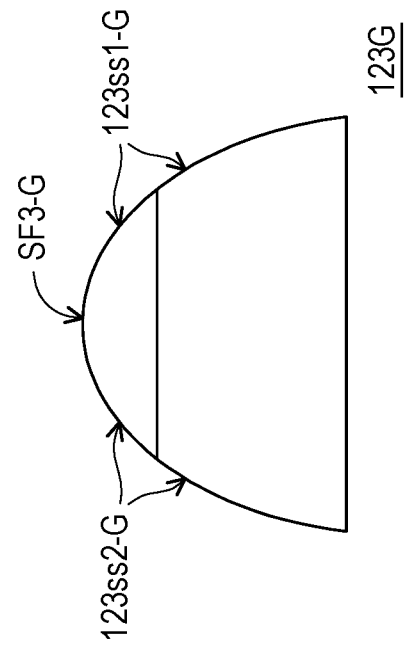

It should be noted that in the blocking wall structure layer 123A in FIG. 7A, the first side surface 123ss1-A and the second side surface 123ss2-A thereof may be disposed asymmetrically. In the blocking wall structure layer 123D, the blocking wall structure layer 123E, the blocking wall structure layer 123F, and the blocking wall structure layer 123G in FIGS. 7D to 7G, a third surface SF3-D, a third surface SF3-E, a third surface SF3-F, and a third surface SF3-G of the blocking wall structure layers are not planar as the third surface SF3 in FIG. 6, a third surface SF3-A in FIG. 7A, a third surface SF3-B in FIG. 7B, and a third surface SF3-C in FIG. 7C.

Figure 7D:
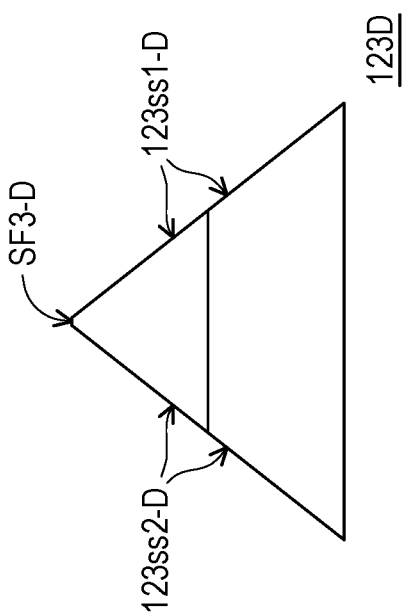
Figure 7F:
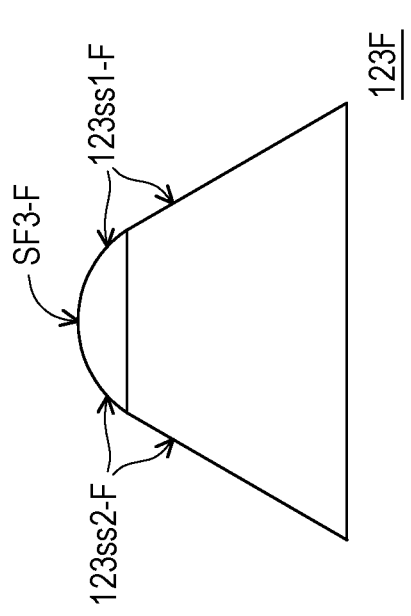

For example, in the blocking wall structure layer 123D in FIG. 7D, the first side surface 123ss1-D intersects with the second side surface 123ss2-D and forms an apex corner. Similarly, in the blocking wall structure layer 123E in FIG. 7E, the first side surface 123ss1-E intersects with the second side surface 123ss2-E and forms an apex corner. In the blocking wall structure layer 123F in FIG. 7F and the blocking wall structure layer 123G in FIG. 7G, both the third surface SF3-F and the third surface SF3-G are curved surfaces.

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 8:
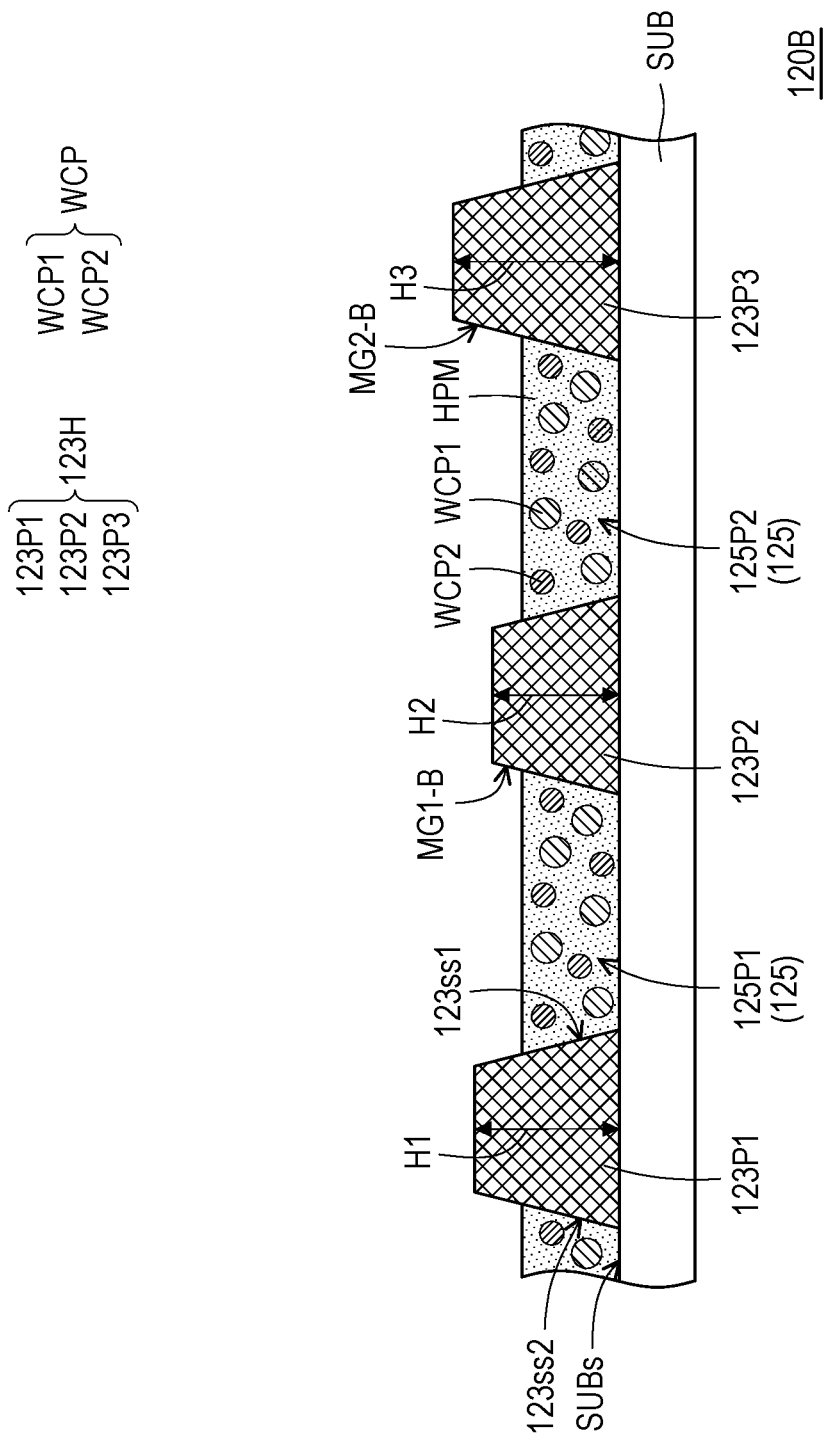
FIG. 8 is a schematic cross-sectional view of a wavelength conversion element according to another embodiment of the disclosure.

FIG. 8 is a schematic cross-sectional view of a wavelength conversion element according to another embodiment of the disclosure. Referring to FIG. 8, a main difference between a wavelength conversion element 120B in this embodiment and the wavelength conversion element 120 in FIG. 2 lies in diversity of a thickness of the blocking wall structure layer. Specifically, a blocking wall structure layer 123H of the wavelength conversion element 120B has two portions defining any one of the microgrooves, for example, a first portion 123P1 and a second portion 123P2 defining a microgroove MG1-B, and the second portion 123P2 and a third portion 123P3 defining a microgroove MG2-B.

It should be noted that respective heights of the portions of the blocking wall structure layer 123H may be different. In this embodiment, the first portion 123P1, the second portion 123P2, and third portion 123P3 of the blocking wall structure layer 123H have a first height H1, a second height H2, and a third height H3 respectively along the normal direction of the surface SUBs of the substrate SUB, and the three heights are different. For example, the first height H1 may be greater than the second height H2, and the third height H3 may be greater than the first height H1. However, the disclosure is not limited thereto. Through the above height difference of the blocking wall structure layer 123H, an adsorption phenomenon between the wavelength conversion element 120B and other optical films may be avoided.

Figure 9:
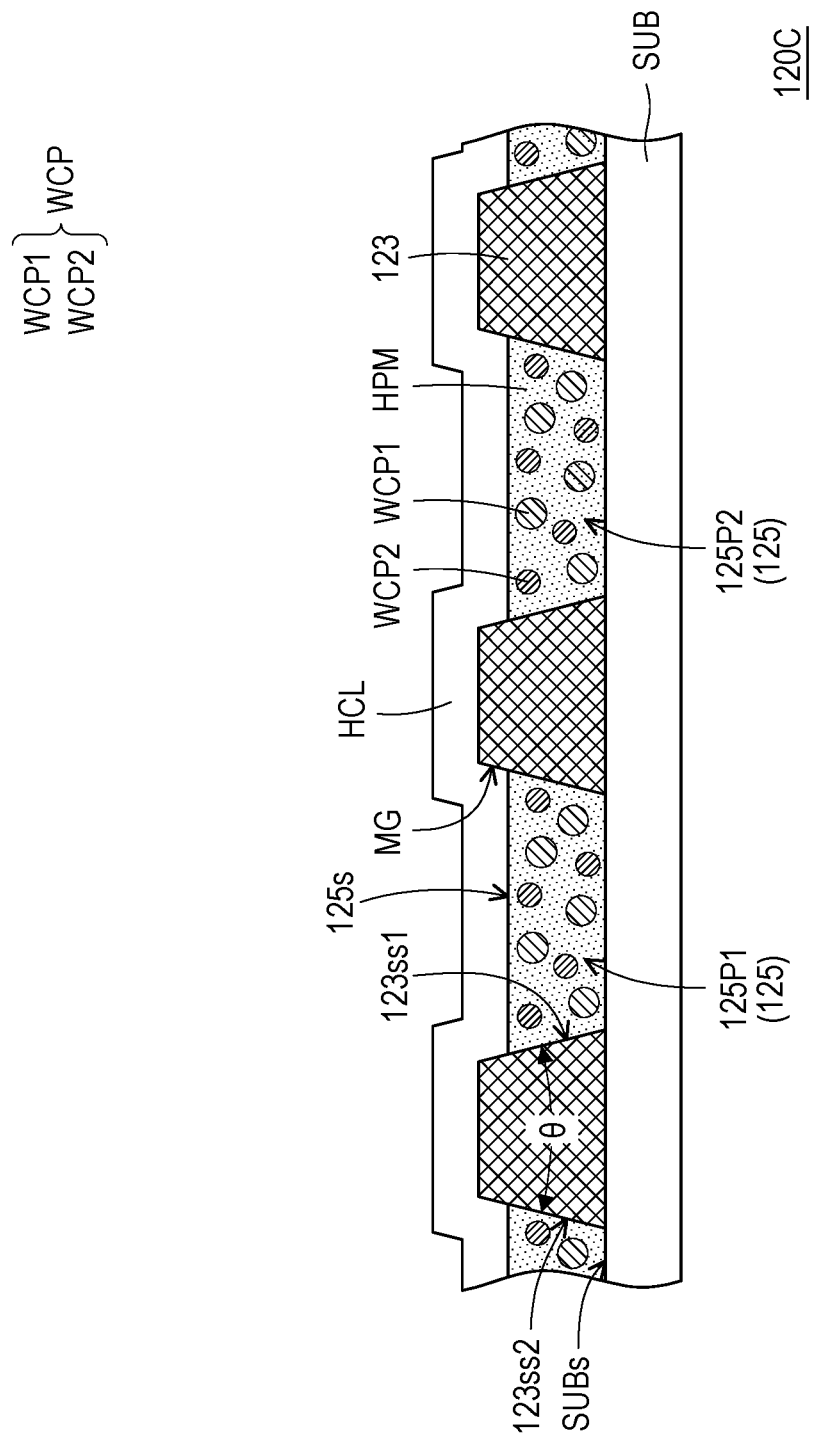
FIG. 9 is a schematic cross-sectional view of a wavelength conversion element according to still another embodiment of the disclosure.

FIG. 9 is a schematic cross-sectional view of a wavelength conversion element according to still another embodiment of the disclosure. Referring to FIG. 9, different from the wavelength conversion element 120 in FIG. 2, a wavelength conversion element 120C in this embodiment may optionally include a hard coat layer HCL. The hard coat layer HCL may cover the surface 125s of the wavelength conversion layer 125 away from the substrate SUB. That is, the wavelength conversion layer 125 in this embodiment is not exposed to the air AIR as the wavelength conversion layer 125 in FIG. 2.

For example, in this embodiment, a water vapor transmission rate of the hard coat layer HCL may be greater than 10 g/m2·day, and an oxygen transmission rate of the hard coat layer HCL may be greater than 10 cm3/m2·day·atm. That is to say, in this embodiment, since the hard coat layer HCL with high water vapor/oxygen blocking capability is used, the wavelength conversion particles WCP of the wavelength conversion layer 125 may also be replaced by wavelength conversion particles that do not contain the hydrophobic functional groups HFG (as shown in FIG. 5).

Figure 10:
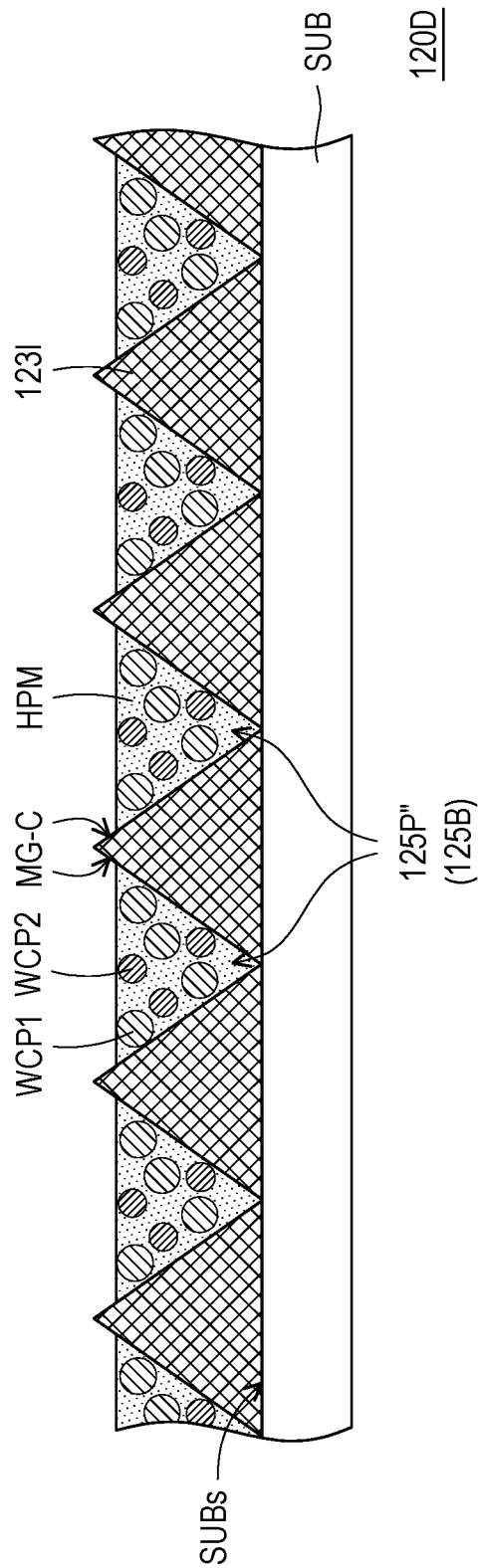
FIG. 10 is a schematic cross-sectional view of a wavelength conversion element according to yet another embodiment of the disclosure.

FIG. 10 is a schematic cross-sectional view of a wavelength conversion element according to yet another embodiment of the disclosure. Referring to FIG. 10, a difference between a wavelength conversion element 120D in this embodiment and the wavelength conversion element 120 in FIG. 2 is that the configuration of the blocking wall structure layer is different. Specifically, in this embodiment, a blocking wall structure layer 123I is, for example, formed by multiple prism structures. The prism structures are disposed side by side along a horizontal direction in FIG. 10, and define multiple microgrooves MG-C.

In this embodiment, a wavelength conversion layer 125B is filled into the microgrooves MG-C between the prism structures (that is, the blocking wall structure layer 123I), and is divided into multiple wavelength conversion patterns 125P" that are arranged at intervals and have a triangular cross-sectional profile (that is, the drawing in FIG. 10). It is particularly noted that, since the prism structures in this embodiment are arranged adjacent to one another, a transmittance of the blocking wall structure layer 123I is higher than transmittances of the blocking wall structure layers in the foregoing embodiments.

Figure 11:
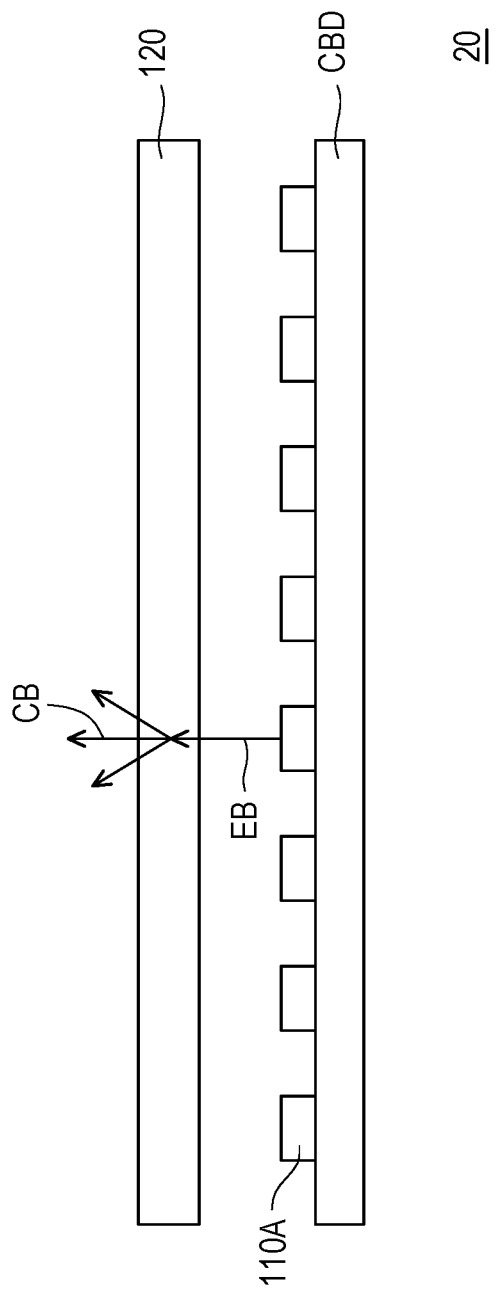
FIG. 11 is a schematic cross-sectional view of a backlight module according to another embodiment of the disclosure.

FIG. 11 is a schematic cross-sectional view of a backlight module according to another embodiment of the disclosure. Referring to FIG. 11, different from the backlight module 10 in FIG. 1 which is the side-entry backlight module, a backlight module 20 in this embodiment is a direct-type backlight module. For example, in this embodiment, the backlight module 20 may include a circuit board CBD and multiple light sources 110A. The light sources 110A are dispersedly disposed on the circuit board CBD and are electrically connected to the circuit board CBD. The wavelength conversion element 120 is disposed overlapping light-emitting surfaces of the light sources 110A, and is adapted to emit the conversion beam CB after absorbing the excitation beam EB emitted by each of the light sources 110A.

Since the wavelength conversion element 120 in this embodiment is similar to the wavelength conversion element 120 in FIG. 1, relevant paragraphs of the foregoing embodiments may be referred for detail descriptions, and the same details will not be repeated in the following. On the other hand, the wavelength conversion element in the foregoing embodiments may be used to replace the wavelength conversion element 120 in this embodiment to meet different application designs or process requirements.

Based on the above, in the wavelength conversion element and the backlight module according to the embodiment of the disclosure, the wavelength conversion layer is disposed in the microgrooves of the blocking wall structure layer, and the filling height of the wavelength conversion layer is lower than height of the blocking wall structure layer. Since the reflectivity of the blocking wall structure layer is in the range of 1% to 90%, in addition to increasing the conversion efficiency of the excitation beam, it may also limit the scattering angle of the conversion beam to increase the amount of light emission in the normal direction. On the other hand, the configuration of the blocking wall structure layer may further improve the stiffness of the wavelength conversion element, which may not only meet the thinning requirements for the overall thickness, but also avoid the issue of the decline in the assembly yield of the backlight module after thinning.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion element, comprising:
    a substrate;
    a blocking wall structure layer disposed on a surface of the substrate and defining a plurality of microgrooves, wherein reflectivity of the blocking wall structure layer is in a range of 1% to 90%; and a wavelength conversion layer disposed in the microgrooves, wherein the wavelength conversion layer comprises a plurality of wavelength conversion particles, a height of the blocking wall structure layer along a normal direction of the surface of the substrate is greater than a height of the wavelength conversion layer along the normal direction of the surface of the substrate, wherein the blocking wall structure layer comprises a plurality of blocking walls with the same extension direction arranged at intervals along at least one direction, and heights of adjacent blocking walls of the plurality of blocking walls are different.

2. The wavelength conversion element according to claim 1, wherein the blocking wall structure layer has a first surface and a second surface away from each other along the normal direction of the surface of the substrate, the first surface and the second surface have a first width and a second width respectively along a direction, the second width is less than or equal to the first width, and both the first width and the second width are less than 0.4 mm.

3. The wavelength conversion element according to claim 1, wherein a material of the blocking wall structure layer comprises titanium dioxide, polymethyl methacrylate, polycarbonate, or polystyrene.

4. The wavelength conversion element according to claim 1, further comprising:
a hard coat layer covering a surface of the wavelength conversion layer away from the substrate.

5. The wavelength conversion element according to claim 1, wherein the wavelength conversion layer has a surface away from the substrate, and the surface of the wavelength conversion layer is exposed to air.

6. The wavelength conversion element according to claim 1, wherein the wavelength conversion layer is a plurality of wavelength conversion patterns, the wavelength conversion patterns are respectively filled in the microgrooves of the blocking wall structure layer, and a thickness difference between any two of the wavelength conversion patterns along the normal direction of the surface of the substrate is less than or equal to 0.5 µm.

7. The wavelength conversion element according to claim 1, wherein the wavelength conversion layer is a plurality of wavelength conversion patterns, the wavelength conversion patterns are respectively filled in the microgrooves of the blocking wall structure layer, each of the wavelength conversion patterns is adapted to absorb an excitation beam and emit a conversion beam, a chromaticity difference of the conversion beams emitted by the wavelength conversion patterns at a chromaticity coordinate x in a CIE1931 color space is less than 0.01, and the chromaticity difference of the conversion beams at a chromaticity coordinate y in the CIE1931 color space is less than 0.01.

8. The wavelength conversion element according to claim 1, wherein the blocking wall structure layer comprises a first structure layer and a second structure layer, the second structure layer is stacked on the first structure layer in the normal direction of the surface of the substrate, the first structure layer has a first surface and a second surface away from each other along the normal direction of the surface of the substrate, the second surface is connected to the second structure layer, the second structure layer has a third surface away from the second surface, the first surface, the second surface, and the third surface have a first width, a second width, and a third width respectively along a direction, the second width is less than or equal to the first width, the third width is less than the second width, and the first width, the second width, and the third width are all less than 0.4 mm.

9. The wavelength conversion element according to claim 1, wherein the height of the blocking wall structure layer along the normal direction of the surface of the substrate is less than 1 mm.

10. The wavelength conversion element according to claim 1, wherein the blocking wall structure layer has a first side surface and a second side surface defining adjacent two of the microgrooves, and the first side surface and the second side surface are plane surfaces, folded surfaces, curved surfaces, or a combination of the above.

11. The wavelength conversion element according to claim 1, wherein each of the wavelength conversion particles comprises:
a core layer;
a shell layer covering the core layer; and
a plurality of hydrophobic functional groups disposed on a surface of the shell layer away from the core layer.

12. The wavelength conversion element according to claim 11, wherein each of the hydrophobic functional groups is a polysilane polymer.

13. The wavelength conversion element according to claim 11, wherein the wavelength conversion layer further comprises a hydrophobic substrate, and the wavelength conversion particles are dispersedly disposed in the hydrophobic substrate.

14. The wavelength conversion element according to claim 1, wherein the blocking wall structure layer comprises a plurality of prism structures, the prism structures are disposed adjacent to one another and define the microgrooves, the wavelength conversion layer is filled in the microgrooves and forms a plurality of wavelength conversion patterns, and cross-sectional profiles of the wavelength conversion patterns are triangular.

15. A backlight module, comprising:
a light source adapted to provide an excitation beam; and
a wavelength conversion element disposed on a transmission path of the excitation beam, and comprises:
a substrate;
a blocking wall structure layer disposed on a surface of the substrate and defining a plurality of microgrooves, wherein reflectivity of the blocking wall structure layer is in a range of 1% to 90%; and
a wavelength conversion layer disposed in the microgrooves, wherein the wavelength conversion layer comprises a plurality of wavelength conversion particles, a height of the blocking wall structure layer along a normal direction of the surface of the substrate is greater than a height of the wavelength conversion layer along the normal direction of the surface of the substrate,
wherein the blocking wall structure layer comprises a plurality of blocking walls with the same extension direction arranged at intervals along at least one direction, and heights of adjacent blocking walls of the plurality of blocking walls are different.

16. The backlight module according to claim 15, wherein each of the wavelength conversion particles comprises:
a core layer;
a shell layer covering the core layer; and
a plurality of hydrophobic functional groups disposed on a surface of the shell layer away from the core layer.

17. The backlight module according to claim 15, further comprising:
a light guide plate having a light incident surface and a light-emitting surface connected to the light incident surface, wherein the light source is disposed on one side of the light incident surface of the light guide plate, and the wavelength conversion element is disposed on one side of the light-emitting surface of the light guide plate.

* * * * *